Patented Feb. 11, 1936

2,030,690

UNITED STATES PATENT OFFICE 2,030,690

TAR ACID PRODUCT AND PROCESS OF PRODUCING IT

Charles Raymond Downs, Old Greenwich, Conn., and Robert Paul Weiss, New York, N. Y., assignors to Weiss and Downs, Inc., New York, N. Y., a corporation of New York No Drawing. Application September 20, 1934, Serial No. 744,788

6 Claims. (Cl. 202—65)

In the production of tar acids, especially the cresols and cresylic acid, the distilled materials which are substantially water white when freshly distilled, darken on standing, especially when exposed to sunlight, and gradually go through various stages of yellow and brown to a dark almost opaque liquid when viewed in a film of moderate thickness. It is very desirable to be able to produce a product which is clear, uniform in color and relatively not susceptible to color change in storage.

We have discovered that if cresylic acid and similar analagous tar acids are treated with small amounts of maleic anhydride and then distilled, a clear pale yellow colored product is produced. The color of this treated distilled material is very similar in shade to the color of a dilute solution of picric acid in water. This colored product may be exposed to direct sunlight for considerable periods without change in appearance and maintains its original color under all ordinary storage conditions, which are far less severe than exposure to sunlight. Equivalent results may be accomplished in some cases by adding the maleic anhydride to the freshly distilled cresylic acid before the latter has had time to discolor.

A specific example to illustrate the invention is cited as follows. A dark crude cresylic acid boiling between 195° C. and 216° C. was distilled with the addition of 1 part of maleic anhydride to 100 parts of cresylic acid. The distilled material was a clear pale yellow color. Another batch of the same crude was distilled without the addition of maleic anhydride and when freshly distilled was colorless. Portions of each were placed in glass stoppered bottles and exposed to sunlight for about 5 hours per day. During the first day of exposure the untreated cresylic acid turned light brown while the treated cresylic acid was unchanged. After eight days of which five were clear and sunshiny, the treated cresylic had only a very slightly deeper yellow shade than at the start while the untreated material was dark brown in color. Stored away from direct sunlight, the treated material showed no change in color.

In another batch, a sample of cresol boiling from about 185 to 191° C. was used. Maleic anhydride in the proportion of 1 part by weight to 400 parts of cresol was added and the material distilled. The distillate was of a pale yellow color stable when exposed to direct sunlight as previously described.

The process may be carried out with maleic anhydride or with substances such as maleic acid and fumaric acid, which can generate maleic anhydride when elevated temperatures are used for the treatment. It is preferable to remove water from the cresylic acid before treating it with maleic anhydride but the invention is not limited to the treatment of dried tar acids. Varying proportions of maleic anhydride have been used but more than 2 parts per 100 parts of cresol do not seem advantageous and very much less can be used with good results. The term "cresylic acid" in the claims is intended to include various cresols and mixtures of them or mixtures of cresols and their homologues. Although specific examples are given, we do not intend to be limited thereby and the scope of the invention is defined in the appended claims.

We claim:

1. The process of treating cresylic acid to render its color stable to light which includes distilling and treating said cresylic acid with about 2% of maleic anhydride before said distilled cresylic acid has become discolored.

2. The process of treating cresylic acid to render its color stable to light which includes distilling and treating said cresylic acid with maleic anhydride in the proportion of not over 2 parts of maleic anhydride to 100 parts of cresylic acid before said distilled cresylic acid has become discolored.

3. The process of treating cresylic acid which comprises treating it with about 2% of maleic anhydride and distilling it.

4. The process of treating cresylic acid which comprises treating it with maleic anhydride in the proportion of not over 2 parts of maleic anhydride to 100 parts of cresylic acid and distilling it.

5. Cresylic acid which has been treated with not over 2% maleic anhydride and distilled.

6. Distilled cresylic acid to which not over 2 percent of maleic anhydride has been added before said distilled cresylic acid has become discolored.

CHARLES R. DOWNS.
ROBERT PAUL WEISS.